US012792409B2

(12) United States Patent
Rao et al.

(10) Patent No.: US 12,792,409 B2
(45) Date of Patent: Nov. 10, 2026

(54) DYNAMIC RESOURCE RESERVATION WITH REINFORCEMENT LEARNING

(71) Applicant: NEC Laboratories America, Inc., Princeton, NJ (US)

(72) Inventors: Kunal Rao, Monroe, NJ (US); Wang-pin Hsiung, Santa Clara, CA (US); Oliver Po, San Jose, CA (US); Murugan Sankaradas, Dayton, NJ (US); Srimat Chakradhar, Manalapan, NJ (US); Anousheh Gholami, San Diego, CA (US)

(73) Assignee: NEC Corporation (JP)

( * ) Notice: Subject to any disclaimer, the term of this patent is extended or adjusted under 35 U.S.C. 154(b) by 650 days.

(21) Appl. No.: 18/322,102

(22) Filed: May 23, 2023

(65) Prior Publication Data

US 2023/0385116 A1 Nov. 30, 2023

Related U.S. Application Data

(60) Provisional application No. 63/345,350, filed on May 24, 2022.

(51) Int. Cl.
*G06F 9/50* (2006.01)
*G06N 20/00* (2019.01)

(52) U.S. Cl.
CPC .......... *G06F 9/5038* (2013.01); *G06F 9/5083* (2013.01); *G06N 20/00* (2019.01)

(58) Field of Classification Search
CPC ........... G06F 2209/5014; G06F 9/5038; G06F 9/5083; G06N 20/00
See application file for complete search history.

(56) References Cited

U.S. PATENT DOCUMENTS

2021/0337555 A1* 10/2021 Fan ....................... H04W 28/24
2021/0406075 A1* 12/2021 Illikkal ................. G06F 9/4881

OTHER PUBLICATIONS

Balalaie et al., "Microservices Architecture Enables DevOps: An Experience Report on Migration to a Cloud-Native Architecture", Ieee Software 33, Mar. 2016, pp. 42-52.
Gholami et al., "Roma: Resource orchestration for microservices-based 5g applications", arXiv preprint arXiv:2201.11067, Feb. 25, 2022, pp. 1-9.
Han et al., "Refining microservices placement employing workload profiling over multiple kubernetes clusters", IEEE Access 8, Oct. 2020, pp. 192543-192556.
Jennings et al., "Resource management in clouds: Survey and research challenges", Journal of Network and Systems Management 23, Mar. 2013, pp. 567-619.

(Continued)

*Primary Examiner* — Arpan P. Savla
(74) *Attorney, Agent, or Firm* — Vincent Duffy

(57) ABSTRACT

Methods and systems for reserving resources include determining a state of a distributed computing system based on resource needs of an application that is executed on the distributed computing system and system resource constraints. An action is determined using the state of the distributed computing system as an input to a trained reinforcement learning model. A resource request is issued for the application to reserve resources based on the action.

16 Claims, 5 Drawing Sheets

(56) References Cited

OTHER PUBLICATIONS

Joseph et al., "Intma: Dynamic interaction-aware resource allocation for containerized microservices in cloud environments", Journal of Systems Architecture 111, Dec. 2020, pp. 1-7.
Rao et al., "ECO: Edge-Cloud Optimization of 5G applications", arXiv:2109.01201v1 [cs.DC] Sep. 2, 2021, pp. 1-11.
Ray et al., "Proactive microservice placement and migration for mobile edge computing", In 2020 IEEE/ACM Symposium on Edge Computing (SEC), Nov. 2020, IEEE, pp. 28-41.
Taibi et al., Processes, motivations, and issues for migrating to microservices architectures: An empirical investigation. IEEE Cloud Computing 4, Oct. 2017, pp. 22-32.
Tomar, "Converting video formats with ffmpeg", Linux J. 2006, 146, Jun. 2006, pp. 1-3.
Wang et al., "Dynamic service migration in mobile edge computing based on markov decision process", arXiv:1506.05261v2 [cs.DC] May 8, 2019, pp. 1272-1288.
Wiering et al., "Fast online Q", Machine Learning 33, Oct. 1998, pp. 105-115.

* cited by examiner

DYNAMIC RESOURCE RESERVATION WITH REINFORCEMENT LEARNING

RELATED APPLICATION INFORMATION

This application claims priority to U.S. Patent Application No. 63/345,350, filed on May 24, 2022, incorporated herein by reference in its entirety.

BACKGROUND

Technical Field

The present invention relates to resource allocation and, more particularly, to reinforcement learning systems that dynamically adapt resource reservations.

Description of the Related Art

Complex networked systems, such as Internet of Things systems that include many devices and/or sensors, can have dynamically varying resource needs. As a result, a static allocation of resources, such as computing resources and network resources, can result in extended periods of underutilization of the reserved resources.

SUMMARY

A method for reserving resources includes determining a state of a distributed computing system based on resource needs of an application that is executed on the distributed computing system and system resource constraints. An action is determined using the state of the distributed computing system as an input to a trained reinforcement learning model. A resource request is issued for the application to reserve resources based on the action.

A system for reserving resources includes a hardware processor and α memory that stores a computer program. When executed, the computer program causes the hardware processor to determine a state of a distributed computing system based on resource needs of an application that is executed on the distributed computing system and system resource constraints, to determine an action using the state of the distributed computing system as an input to a trained reinforcement learning model, and to issue a resource request for the application to reserve resources based on the action.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To respond to the dynamic variation of resource requirements and non-linear coupling relationships between computing and networking resource needs, resource requests may be optimized for applications automatically using reinforcement learning. For example, application-specific computing and network coupling relationships may be automatically captured in a reinforcement learning model, enabling of resource allocation options to better utilize reserved resources. With accurate and dynamically varying resource allocations, the underutilization of resources can be minimized, thereby improving the practical computing and network resource capacities of the system. Although computing and networking resources are specifically contemplated and discussed herein, it should be understood that additional or alternative resources may be used.

Figure 1:
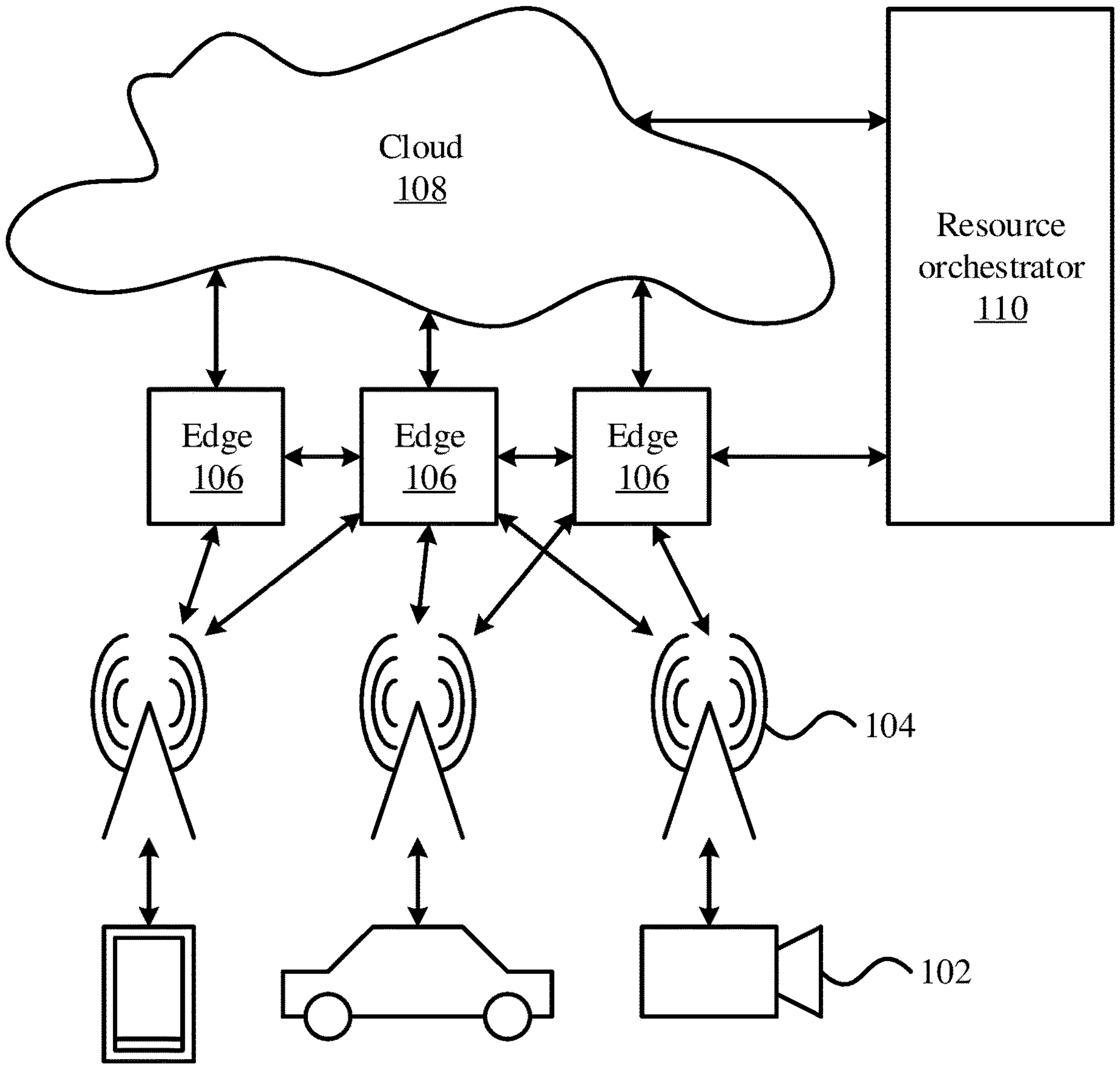
FIG. 1 is a diagram of a distributed computing system with dynamic resource reservation of computing and networking resources, in accordance with an embodiment of the present invention.

Referring now to FIG. 1, a multi-tiered edge-cloud environment is shown. The environment includes a variety of Internet of Things (IoT) devices 102, which may include, e.g., mobile devices such as phones and tablets, connected vehicles, sensors such as cameras, and any of a variety of other distributed devices. The IoT devices 102 communicate with radio access points 104, for example base stations or cellular access nodes. The IoT devices 102 thereby communicate with edge nodes 106, which can perform local processing and which can communicate with further computing resources in the cloud 108. Exemplary applications for such an environment may include autonomous driving, smart manufacturing, remote health, augmented or virtual reality, and any other appropriate purpose or function.

The radio access points 104 may represent any appropriate form of networking resource, and may for example make up a mobile telephony/data network such as a 5G network, may make up a local area network (LAN), metropolitan area network (MAN), or wide area network (WAN). Multiple different networking arrangements maybe used in a single cloud networking system. These different networking arrangements have varying capacity and service level guarantees. The different networking capabilities at different tiers, for example with 5G connections between IoT devices 102 and edge nodes 106, with a MAN between the distributed edge nodes 106, and with a WAN between the edge nodes 106 and the cloud 108, and the changing network conditions further add to the dynamic networking environment. While wireless access is specifically contemplated, it should be understood that the present principles may also apply to IoT devices 102 that communicate with the distributed computing system via a wired communications medium.

A resource orchestrator 110 communicates with the computing and networking infrastructure and has a global view of application components running across different computing tiers. Resource reservation may be performed by the resource orchestrator 110, which may act to ensure that multiple applications running across the system have access to the resources that they need to operate. The resource reservation requests may be transmitted by the resource orchestrator 110 to the underlying computing and networking infrastructure components.

For applications to meet specific performance needs, they may reserve certain amounts of resources, such as network bandwidth and processing time. Network bandwidth may be allocated by network infrastructure devices, such as routers and switches that implement software defined networking and traffic shaping. Computing resources may be allocated by allocating processor cores, by scheduling individual processor cores, and by instantiating and deallocating processing resources responsive to the resource reservation requests. The infrastructure providers may charge the applications on the basis of these reservations, with the reservation of larger amounts of resources corresponding to higher costs. Minimizing the reservations needed therefore reduces the costs of operating the application.

Over the lifetime of the application, neither the infrastructure's capacity nor the environment remains fixed. For example, as the number and type of applications being executed by the infrastructure changes, so too do the resources needed by those applications. An example of this is that the resources needed by a video analytics application may change responsive to changes in the scene viewed by a video camera. This leads to variations in the amount of network and computing resources needed by the application, such that a static, one-time fixed reservation would need to overprovision resources to ensure that the application can operate in dynamically varying conditions.

For example, an object detection pipeline may include a video camera that acts as an IoT sensor, with object detection being performed and with alerts being issued upon the detection of certain types of objects. The video camera may communicate with an edge node 106 that performs the object detection, while an application in the cloud 108 may include a database of alert information and may issue alerts responsive to the detected objects. During execution of the object detection application, networking resources are needed to communicate the video stream from the video camera and computing resources are needed to analyze the frames of the video stream to detect objects.

The network bandwidth needed by the video stream from the camera may vary over time. For example, the video stream may use a lower bitrate when there is little variation from one frame to another, but may use a higher bitrate when there is significant variation. An example of an environment with little variation is a night scene with little activity, contrasted to a view of the same scene taken during the day with substantial pedestrian traffic. Such periodic variation can be learned and leveraged to dynamically adjust the reserved network resources.

As the network bandwidth usage varies, the computing resources needed to process the video stream also vary. In this example, a larger volume of video data corresponds to a larger amount of processing power needed to handle that data. Identifying relationships between network resource usage and computing resource usage can similarly be leveraged to change reservations of one type of resource responsive to changes in the other.

In some cases, the available networking and computing resources may not be sufficient to meet the resource needs for all applications. The changes in infrastructure conditions can directly impact the resource reservations that an application can make. When one resource is under-provisioned due to a lack of available resources, then changes can be made to another resource reservation to reflect that diminished capacity. For example, if the amount of bandwidth is limited, then the computing resource reservation may be reduced to reflect the lowered data throughput. The same is true when the circumstances are reversed—a limitation on the amount of available computing resources may trigger a corresponding decrease in the reservation for networking resources.

To that end, the reservation of resources to different applications may be accomplished by slicing. The set of computing nodes is denoted herein as $\mathcal{M}$ and the set of different resources types is denoted herein as $\mathcal{T}$. Each node $m \in \mathcal{M}$ is specified by ($g_m$, $tier_m$), where $$g_m = [g_m^t, t \in \mathcal{T}]$$

is the vector of available resources and $tier_m$ denotes the associated tier.

An application may be modeled as a set of functions or microservices and interconnections that represent the data dependency between functions. The graph G=(V, E) represents the application, where V denotes the set of functions in the application and E represents the interconnections, such as data dependencies between functions. The term $\mathcal{R}_v=(\omega_v, \mathcal{C}_v)$ denotes the function v's requirements, where $\omega_v$ and $\mathcal{C}_v=(core_{min,v}, tier_v)$ are the networking and computing needs of the application, respectively. The term $core_{min,v}$ is the minimum number of cores needed for the function v. The term $\mathcal{C}_v$ specifies the computation requirements of the function v, where $tier_v$ is the infrastructure tier where function v should be placed (if such requirement exists).

Since the demands for resources fluctuate over time, a dynamic resource allocation may be used to address adjustments in the resource usage or placement decisions, taking into account coupling relationships between the resources. Toward that end, a reinforcement learning-based orchestration system periodically may automatically derive resource coupling relationships and select a best action, for example using a state-action-reward-state-action reinforcement learning model. The available amount of a resource t on a node m may be quantized into L levels, denoted by the set $$\mathcal{G}_m^t = \{g_{m,1}^t, \ldots, g_{m,L}^t\}.$$

The amount of a resource $t \in \mathcal{T}$ at a node $m \in \mathcal{M}$, allocated to a function $v \in V$ may be expressed as $$y_{v,m}^t.$$

A valid resource allocation satisfies node constraints given by:

$$y_{v,m}^t \le g_m^t, \forall t \in \mathcal{T}, v \in V, m \in \mathcal{M}$$

The resource allocation may be formulated as an episodic reinforcement learning process, so that the infrastructure nodes' capacities are not violated. The decision-making process may be formulated as a Markov decision process, denoted by the tuple <o, a, r>, including the state o, an action a, and α corresponding reward r.

The state of the system at a time step i may be represented by the tuple $$o_i = \left(\{g_m^{t,i} \in \mathcal{G}_m^t\},\ \{y_{v,m}^{t,i}\}\right).$$

The function placement decisions may be given according to heuristic solutions and may focus on the resource application problem to reduce the size of the state space.

An action may include a valid resource reservation that determines the amount of a given resource which an infrastructure node hosting and application microservice may consume. The action set may include A=5|V| actions, capturing the five possible actions for each function. These actions may include an increase to a computing resource reservation, a decrease to a computing resource reservation, an increase to a networking resource reservation, a decrease to a networking resource reservation, and an action that indicates no change to the reservations.

A reward function is used as feedback to a reinforcement learning system, where performance is improved based on the reward value after an action is performed. To increase the likelihood of good actions, the reward function generates a positive reward. A reward value may be defined as:

$$d_i = \frac{\alpha p_{i+1}}{\sum_{t,v,m} \beta_t y_{v,m}^{t,i+1}} - \frac{\alpha p_i}{\sum_{t,v,m} \beta_t y_{v,m}^{t,i}}$$

where $p_i$ is a performance metric of a target application and α and $\beta_t$ are parameters that characterize a tradeoff between the computing resources, network resources, and performance metric. The reward value $d_i$ is positive if the difference between the fraction of performance over total resources used from step i to step i+1 is positive. The reinforcement learning reward function can then generate outputs as:

$$r_i = r(o_i, a_i, a_{i+1}) = \begin{cases} d_i & \text{if } y_{v,m}^t \le g_m^t \\ -H & \text{otherwise} \end{cases}$$

where H is a large positive number. The reinforcement learning agent receives a penalty if it reserves resources such that the capacity constraint for infrastructure nodes is violated.

Figure 2:
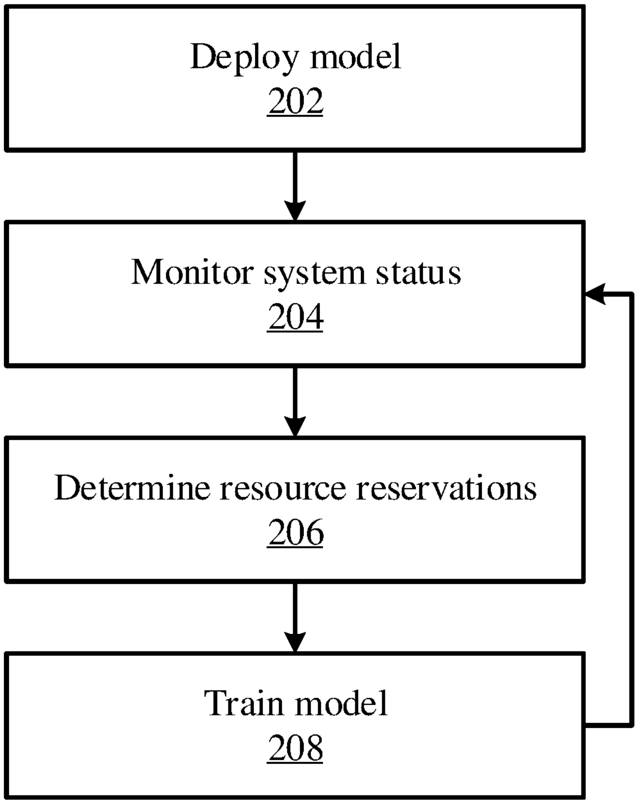
FIG. 2 is a block/flow diagram of a method of dynamically reserving computing and networking resources within a distributed computing system, in accordance with an embodiment of the present invention.

Referring now to FIG. 2, an overview of the implementation of a reinforcement learning model for resource reservation is shown. Block 202 deploys the model to a live system, where the live system monitors the system status and the relationship between system status and resource needs at block 204.

During operation, the reinforcement learning model is used to allocate resources to an application in block 206. The trained model computes the reward for the application based on application-specific measurements. For example, the application may reserve computing resources from the edge nodes 106 or the cloud 108 and may reserve networking resources from the radio access nodes 104. The application may determine a state of the system based on, e.g., its own internal state and information gleaned from the network. For example, internal state information may include its own instantaneous computing and networking needs and external state information may include information relating to the availability of network and computing resources, such as the current available capacities of nodes within the system. Based on the ongoing monitoring, block 208 trains the reinforcement learning model responsive to the interrelationship between the resource reservations and the state of the system, for example using a state-action-reward-state-action model. Processing returns to block 204 to monitor the updated system status and new resource reservations at block 204 are iteratively performed to respond to the system's changing conditions.

Figure 3:
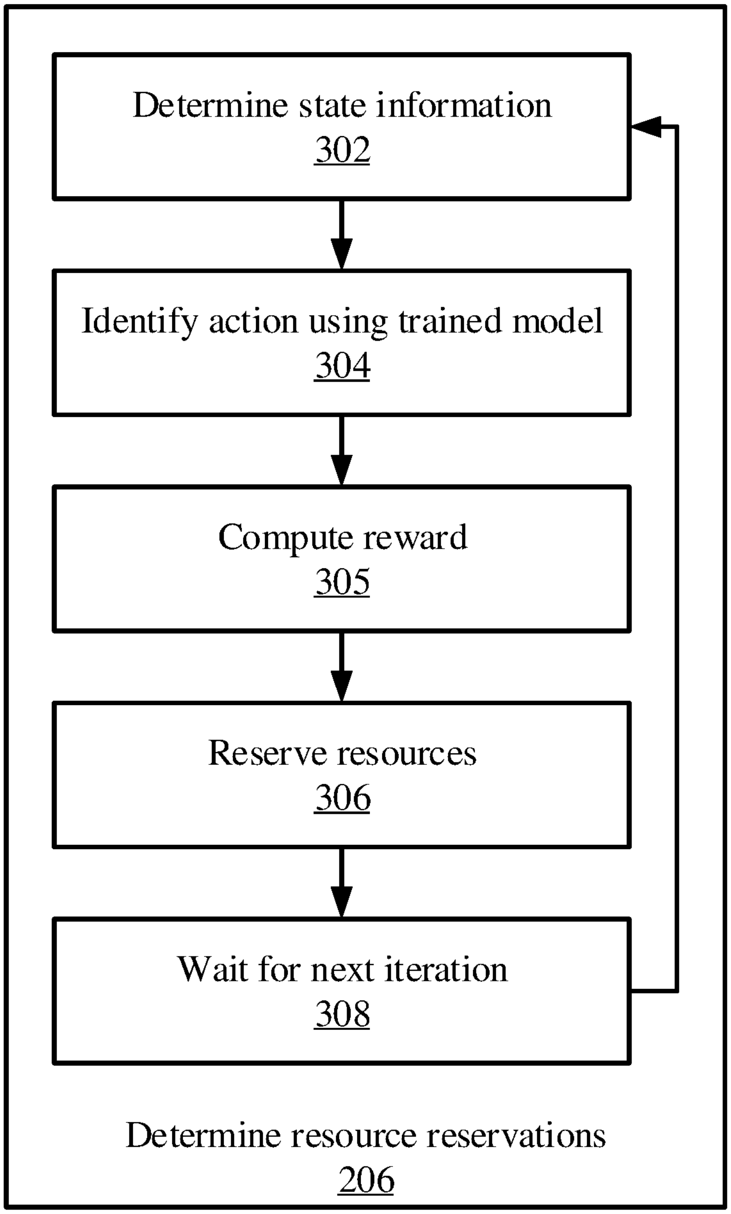
FIG. 3 is a block/flow diagram of a method of determining what resources to reserve for an application in a distributed computing system, in accordance with an embodiment of the present invention.

Referring now to FIG. 3, additional detail on the determination of resource reservations 206 is shown. Block 302 determines relevant state information, for example including internal state information and external state information. This state is used as an input to the trained reinforcement learning model, which outputs a valid action that maximizes a reward function in block 306, with the computation of the reward being performed in block 305. The reward function may also be used to refine the trained model. For example, the reward function may represent a performance metric of the application, while the valid action represents a set of resource reservations that can be satisfied by the system and that account for relationships between constraints on different resources.

Block 306 issues the reservation requests. For example, this may include reserving computing resources from the edge nodes 106 or the cloud 108 and networking resources from the access nodes 104. Once the reservations have been made, block 308 waits until a next iteration begins. This duration may be defined by a predetermined period, for example a predetermined number of seconds, minutes, or hours, after which processing returns to block 302 and an updated state is determined.

In some cases, a next iteration may be determined by detected changes in the internal or external state. For example, block 308 may detect a change in the resources needed by the application, or may receive information relating to a change in the resource capacities of the system. This may trigger an early update if it occurs before the predetermined period has elapsed. In some cases the next iteration may be triggered exclusively by the detected changes to the state, in some cases the next iteration may be triggered exclusively periodically, in some cases the next iteration may be triggered by a combination of both changes to the state and periodically, and in some cases the next iteration may be triggered by one or more other factors.

Figure 4:
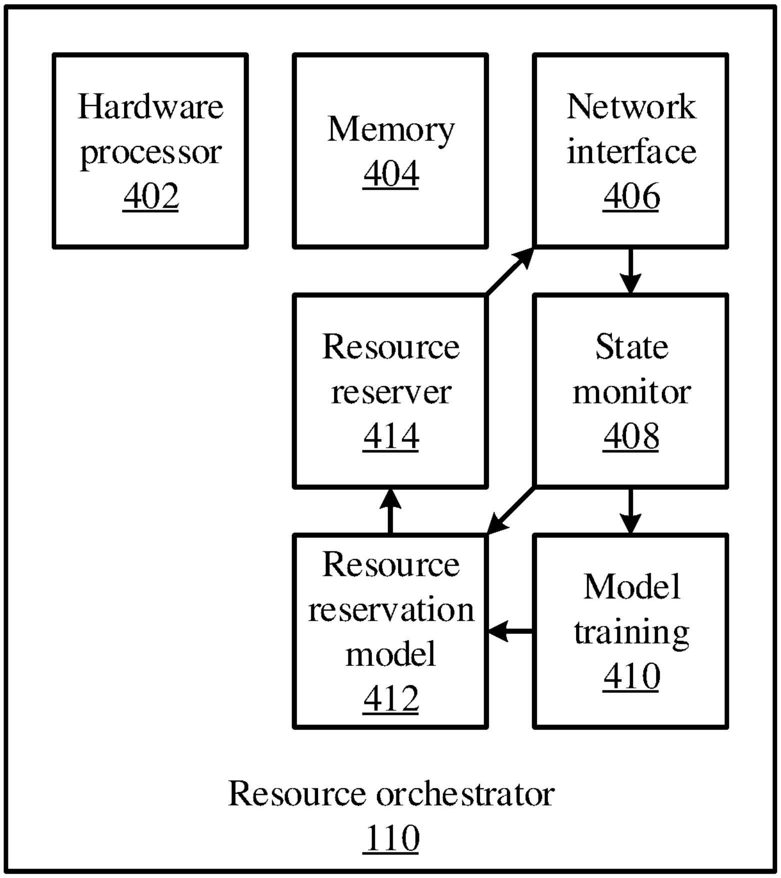
FIG. 4 is a block diagram of a resource orchestrator system that is configured to dynamically reserve computing and networking resources for an application within a distributed computing system, in accordance with an embodiment of the present invention.

Referring now to FIG. 4, additional detail on the resource orchestrator 110 is shown. While the resource orchestrator 110 is shown and described herein as being a standalone hardware device, it should be understood that the functions of the resource orchestrator 110 may be performed within an edge node 106 or within the cloud 108.

The resource orchestrator 110 includes a hardware processor 402 and α memory 404. A network interface 406 may provide communications with other elements of the computing system, including edge nodes 106, cloud computing elements 108, network infrastructure, and the devices 102. The resource orchestrator 110 may include a number of functional modules which may be implemented as software that is stored in the memory 404 and that is executed by the hardware processor 402. In some cases, one or more of the functional modules may be implemented as discrete hardware components. In some cases, one or more of the functional modules may be implemented in a separate hardware device and may communicate with the resource orchestrator 110.

A state monitor 408 receives information from the network interface 406, which may include information from the components of the distributed computing system relating to their respective computing and/or networking resource capacities. The state monitor 408 may furthermore monitor the resource needs of one or more applications being executed within the distributed computing system.

The monitored state information may be used by model training 410 to identify how parameters of the resource reservation model 412 should be changed to improve future performance. The monitored state information may further be used as an input to the resource reservation model 412 to identify an action to take, for example in the form if a set of resource reservation requests relating to the operation of an application. A resource reserver 414 sends the resource reservation requests to components of the distributed computing system using the network interface 406. For example, the resource reservation requests may include requests for computing resources from the edge nodes 106 and the cloud 108 and may further include requests for networking resources from the networking infrastructure.

Figure 5:
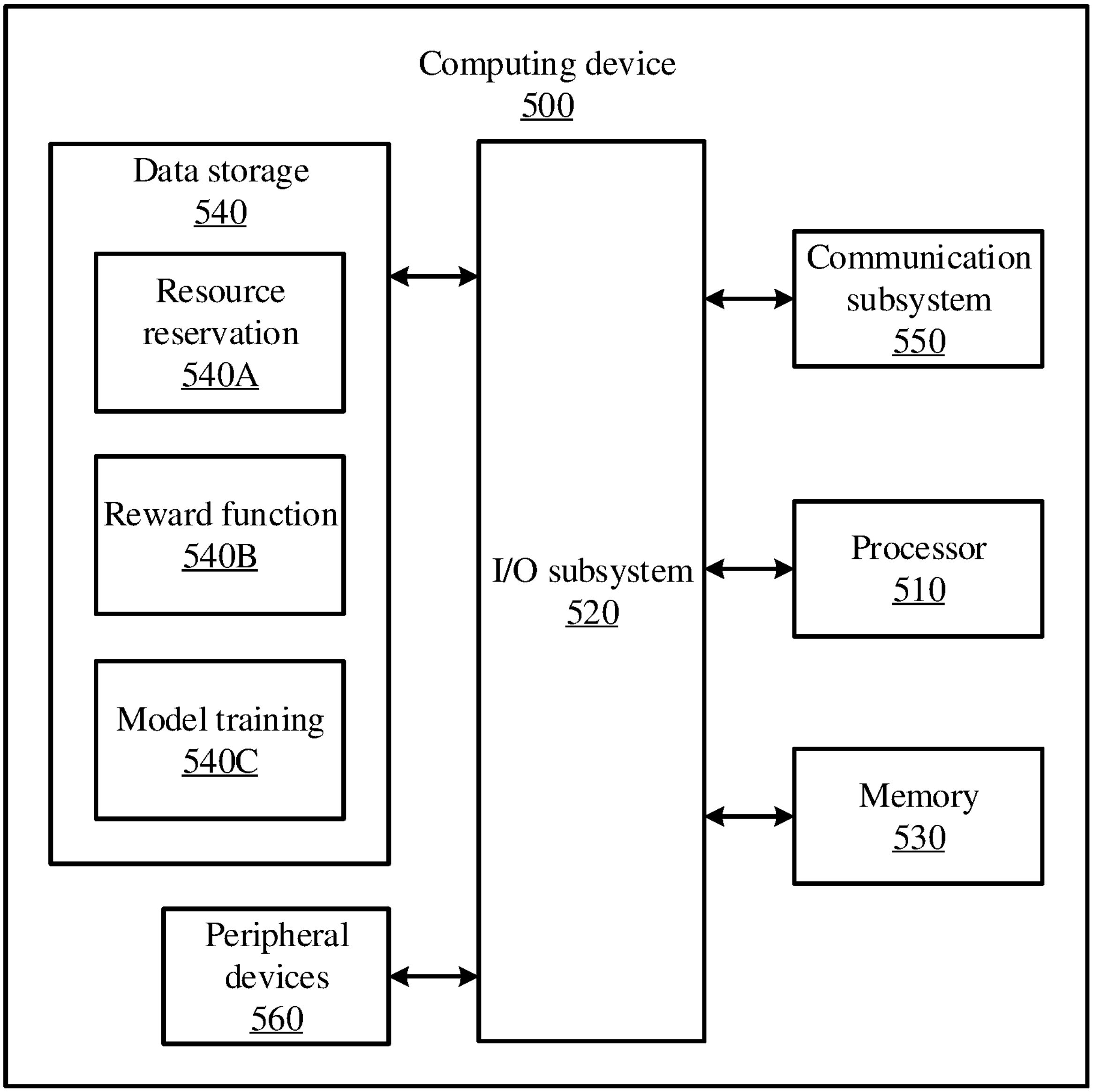
FIG. 5 is a block diagram of a computer processing system that can perform the role of a resource orchestrator for dynamic resource reservation, in accordance with an embodiment of the present invention.

As shown in FIG. 5, the computing device 500 illustratively includes the processor 510, an input/output subsystem 520, a memory 530, a data storage device 540, and α communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for performing resource reservation based on monitored system state information, program code 540B for determining a reward value for a given action based on the monitored system state information, and/or program code 540C for training a reinforcement learning model based on the monitored system state information. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/of", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for reserving resources, comprising:

determining a state of a distributed computing system based on resource needs of an application that is executed on the distributed computing system and system resource constraints;

determining an action using the state of the distributed computing system as an input to a trained reinforcement learning model that includes a reward function based on a performance metric of the application, with a reward value $d_i$ at a time step i, defined as:

$$d_i = \frac{\alpha p_{i+1}}{\sum_{t,v,m} \beta_t y_{v,m}^{t,i+1}} - \frac{\alpha p_i}{\sum_{t,v,m} \beta_t y_{v,m}^{t,i}}$$

where $p_i$ is a performance metric of the application at time step i, and $\alpha$ and $\beta_t$ are parameters that characterize a tradeoff between the computing resources, network resources, and performance metric, and $$y_{v,m}^{t,i}$$

is an amount of a resource t at a time step i at a node m, allocated to a function v; and reserving computing resources for the application in accordance with the determined action.

2. The method of claim 1, further comprising repeating the determination of the state of the distributed computing system, the determination of the resource request, and the issuance of the resource request responsive to satisfying an iteration criterion.

3. The method of claim 2, wherein the iteration criterion comprises passage of a predetermined time period.

4. The method of claim 2, wherein the iteration criterion comprises a change to the state of the distributed computing system.

5. The method of claim 1, wherein the reward function includes a constraint to enforce resource capacity limits.

6. The method of claim 1, wherein the resource request includes a request for computing resources and a request for networking resources.

7. The method of claim 1, wherein the trained reinforcement learning model characterizes coupling relationships between computing resources and networking resources.

8. The method of claim 1, wherein the state of the distributed computing system includes current computing and networking resource usage and capacity of the distributed computing system.

9. A system for reserving resources, comprising:

a hardware processor; and a memory that stores a computer program which, when executed, causes the hardware processor to:

determine a state of a distributed computing system based on resource needs of an application that is executed on the distributed computing system and system resource constraints;

determine an action using the state of the distributed computing system as an input to a trained reinforcement learning model that includes a reward function based on a performance metric of the application, with a reward value $d_i$ at a time step i, defined as:

$$d_i = \frac{\alpha p_{i+1}}{\sum_{t,v,m} \beta_t y_{v,m}^{t,i+1}} - \frac{\alpha p_i}{\sum_{t,v,m} \beta_t y_{v,m}^{t,i}}$$

where $p_i$ is a performance metric of the application at time step i, and $\alpha$ and $\beta_t$ are parameters that characterize a tradeoff between the computing resources, network resources, and performance metric, and $$y_{v,m}^{t,i}$$

is an amount of a resource t at a time step i at a node m, allocated to a function v; and reserve computing resources for the application in accordance with the determined action.

10. The system of claim 9, wherein the computer program further causes the hardware processor to repeat the determination of the state of the distributed computing system, the determination of the resource request, and the issuance of the resource request responsive to satisfying an iteration criterion.

11. The system of claim 10, wherein the iteration criterion comprises passage of a predetermined time period.

12. The system of claim 10, wherein the iteration criterion comprises a change to the state of the distributed computing system.

13. The system of claim 9, wherein the reward function includes a constraint to enforce resource capacity limits.

14. The system of claim 9, wherein the resource request includes a request for computing resources and a request for networking resources.

15. The system of claim 9, wherein the trained reinforcement learning model characterizes coupling relationships between computing resources and networking resources.

16. The system of claim 9, wherein the state of the distributed computing system includes current computing and networking resource usage and capacity of the distributed computing system.

* * * * *